(12) United States Patent
Miura et al.

(10) Patent No.: US 12,360,470 B2
(45) Date of Patent: Jul. 15, 2025

(54) EXTERNAL ADDITIVE FOR TONER, TONER AND IMAGE FORMING APPARATUS

(71) Applicant: CANON KABUSHIKI KAISHA, Tokyo (JP)

(72) Inventors: Masaharu Miura, Ibaraki (JP); Ichiro Kanno, Chiba (JP); Kaoru Yoshida, Ibaraki (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 661 days.

(21) Appl. No.: 17/542,006

(22) Filed: Dec. 3, 2021

(65) Prior Publication Data

US 2022/0187728 A1  Jun. 16, 2022

(30) Foreign Application Priority Data

Dec. 10, 2020 (JP) .................... 2020-205200
Nov. 18, 2021 (JP) .................... 2021-187460

(51) Int. Cl.
*C08G 77/04* (2006.01)
*G03G 9/08* (2006.01)
*G03G 9/097* (2006.01)
*G03G 21/00* (2006.01)

(52) U.S. Cl.
CPC ......... *G03G 9/09775* (2013.01); *C08G 77/04* (2013.01); *G03G 9/0819* (2013.01); *G03G 21/0011* (2013.01)

(58) Field of Classification Search
None
See application file for complete search history.

(56) References Cited

U.S. PATENT DOCUMENTS

| | | |
|---|---|---|
| 8,999,617 B2 | 4/2015 | Iida et al. |
| 9,057,970 B2 | 6/2015 | Ida et al. |
| 9,152,088 B1 | 10/2015 | Kobori et al. |
| 9,348,247 B2 | 5/2016 | Ida et al. |
| 9,348,253 B2 | 5/2016 | Kanno et al. |
| 9,417,540 B2 | 8/2016 | Hashimoto et al. |
| 9,436,112 B2 | 9/2016 | Iwasaki et al. |
| 9,540,483 B2 | 1/2017 | Ida et al. |
| 9,651,883 B2 | 5/2017 | Hama et al. |
| 9,665,023 B2 | 5/2017 | Kamae et al. |
| 9,665,026 B2 | 5/2017 | Iwasaki et al. |
| 9,696,644 B2 | 7/2017 | Ida et al. |
| 9,809,682 B2 | 11/2017 | Ishizu |
| 9,897,934 B2 | 2/2018 | Tamura et al. |
| 9,915,885 B2 | 3/2018 | Katsumata et al. |
| 9,969,834 B2 | 5/2018 | Ohtsu et al. |
| 10,012,918 B2 | 7/2018 | Ishigami et al. |
| 10,012,920 B2 | 7/2018 | Shibata et al. |
| 10,012,921 B2 | 7/2018 | Kamae et al. |
| 10,036,970 B2 | 7/2018 | Kanno et al. |
| 10,078,281 B2 | 9/2018 | Ida et al. |
| 10,082,743 B2 | 9/2018 | Hama et al. |
| 10,088,765 B2 | 10/2018 | Miyakai et al. |
| 10,133,201 B2 | 11/2018 | Kamae et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,216,108 B2 | 2/2019 | Iwasaki et al. |
| 10,228,629 B2 | 3/2019 | Tamura et al. |
| 10,234,777 B2 | 3/2019 | Ohtsu et al. |
| 10,274,851 B2 | 4/2019 | Hashimoto et al. |
| 10,353,312 B2 | 7/2019 | Kamae et al. |
| 10,401,748 B2 | 9/2019 | Hashimoto et al. |
| 10,423,086 B2 | 9/2019 | Hama et al. |
| 10,423,090 B2 | 9/2019 | Ohtsu et al. |
| 10,451,986 B2 | 10/2019 | Sano et al. |
| 10,451,990 B2 | 10/2019 | Kamae et al. |
| 10,474,049 B2 | 11/2019 | Onozaki et al. |
| 10,514,624 B2 | 12/2019 | Tamura et al. |
| 10,564,560 B2 | 2/2020 | Onozaki et al. |
| 10,599,060 B2 | 3/2020 | Kanno et al. |
| 10,642,178 B2 | 5/2020 | Yamashita et al. |
| 10,656,545 B2 | 5/2020 | Kamae et al. |
| 10,775,710 B1 | 9/2020 | Kamae et al. |
| 10,859,931 B2 | 12/2020 | Hashimoto et al. |
| 10,877,386 B2 | 12/2020 | Murayama et al. |

(Continued)

FOREIGN PATENT DOCUMENTS

| CN | 104076626 A | 10/2014 |
|---|---|---|
| EP | 3 674 800 A1 | 7/2020 |

(Continued)

OTHER PUBLICATIONS

U.S. Appl. No. 17/457,766, filed Dec. 6, 2021, Yuya Chimoto.
U.S. Appl. No. 17/457,822, filed Dec. 6, 2021, Hisasuke Kajihara.
U.S. Appl. No. 17/536,853, filed Nov. 29, 2021, Hisasuke Kajihara.
U.S. Appl. No. 17/648,330, filed Jan. 19, 2022, Hiroki Watanabe.
U.S. Appl. No. 17/648,333, filed Jan. 19, 2022, Ichiro Kanno.
U.S. Appl. No. 17/648,368, filed Jan. 19, 2022, Ichiro Kanno.
U.S. Appl. No. 17/654,461, filed Mar. 11, 2022, Yukihiro Abe.
U.S. Appl. No. 17/654,481, filed Mar. 11, 2022, Kazuki Murata.

*Primary Examiner* — Mark F. Huff
*Assistant Examiner* — Charles Collins Sullivan, IV
(74) *Attorney, Agent, or Firm* — VENABLE LLP

(57) ABSTRACT

An external additive for toner, wherein the external additive is an organosilicon polymer particle, and defining A (nm) as the number-average particle diameter of primary particles of the external additive measured using a scanning electron microscope, and defining B (nm) as the number-average particle diameter of the external additive measured in accordance with a centrifugal sedimentation method, the A and the B satisfy a following Expression (1):

$$1.5 \leq B/A \leq 3.0 \qquad (1).$$

11 Claims, No Drawings

(56) References Cited

U.S. PATENT DOCUMENTS

| | | |
|---|---|---|
| 10,935,902 B2 | 3/2021 | Kanno et al. |
| 10,955,765 B2 | 3/2021 | Onozaki et al. |
| 10,969,705 B2 | 4/2021 | Shirayama et al. |
| 11,029,617 B2 | 6/2021 | Chimoto et al. |
| 11,131,939 B2 | 9/2021 | Hama et al. |
| 11,181,848 B2 | 11/2021 | Ochi et al. |
| 2006/0099016 A1 | 5/2006 | Watanabe |
| 2010/0067949 A1 | 3/2010 | Watanabe |
| 2010/0247148 A1* | 9/2010 | Haruyama ............ G03G 9/0827 399/350 |
| 2013/0108955 A1 | 5/2013 | Shibata et al. |
| 2013/0288173 A1 | 10/2013 | Hashimoto et al. |
| 2014/0329176 A1 | 11/2014 | Kanno et al. |
| 2015/0099227 A1 | 4/2015 | Ida et al. |
| 2016/0041482 A1* | 2/2016 | Terauchi ................ G03G 13/08 430/105 |
| 2016/0109820 A1 | 4/2016 | Hashimoto et al. |
| 2016/0187799 A1 | 6/2016 | Hiroshi et al. |
| 2016/0319077 A1* | 11/2016 | Ishizu ................ G03G 9/09708 |
| 2016/0320739 A1 | 11/2016 | Kato |
| 2018/0120721 A1 | 5/2018 | Obara et al. |
| 2018/0275540 A1 | 9/2018 | Matsuo et al. |
| 2018/0314176 A1 | 11/2018 | Ikeda et al. |
| 2018/0329325 A1* | 11/2018 | Hatakeyama ...... G03G 9/09733 |
| 2019/0212667 A1 | 7/2019 | Chiba et al. |
| 2021/0063903 A1 | 3/2021 | Shibata et al. |
| 2021/0141315 A1 | 5/2021 | Kamae et al. |
| 2021/0181647 A1 | 6/2021 | Hashimoto et al. |
| 2021/0181649 A1 | 6/2021 | Kanno et al. |
| 2021/0181650 A1 | 6/2021 | Hama et al. |
| 2021/0181651 A1 | 6/2021 | Kanno et al. |
| 2021/0278774 A1 | 9/2021 | Hashimoto et al. |
| 2021/0278775 A1 | 9/2021 | Kamae et al. |
| 2021/0286282 A1 | 9/2021 | Kobori et al. |
| 2021/0397106 A1 | 12/2021 | Kobori et al. |

FOREIGN PATENT DOCUMENTS

| | | |
|---|---|---|
| EP | 3 674 804 A1 | 7/2020 |
| JP | 2007-99582 A | 4/2007 |
| JP | 2009-128842 A | 6/2009 |
| JP | 2018-4949 A | 1/2018 |
| KR | 10-2017-0094515 A | 8/2017 |
| WO | 2015/107961 A1 | 7/2015 |

* cited by examiner

EXTERNAL ADDITIVE FOR TONER, TONER AND IMAGE FORMING APPARATUS

BACKGROUND OF THE INVENTION

Field of the Invention

The present disclosure relates to an external additive for toner, to a toner that utilizes the external additive for toner and is used in an electrophotographic system, and to an image forming apparatus that utilizes the toner.

Description of the Related Art

The growing spread of the use of electrophotographic full-color copiers in recent years has placed further demands also on the toners that are used in electrophotographic schemes, in terms of coping with printing at higher speeds, and achieving longer life.

Silica is widely known in conventional art as an external additive used in toners. For instance Japanese Patent Application Publication No. 2007-099582 illustrates the addition of highly hydrophobic spherical sol-gel silica fine particles to a toner base particle, to improve the charging stability of toner.

However, silica particles become buried into the surface of the toner particle in environments where stress acts on the toner, on account of significant contact with members such as a carrier, for instance in cases of output of images of low print density over long periods of time or in cases of image output in high-temperature, high-humidity environments. The surface condition of the toner changes significantly as a result, and thus there is room for improvement in terms of drops in attachment force, drops in flowability, and charging stability.

Meanwhile, WO 2015/107961 and Japanese Patent Application Publication No. 2018-004949 illustrate addition of polyalkylsilsesquioxane fine particles to a toner particle, to improve the durability stability of the toner. The hardness of the polyalkylsilsesquioxane fine particles is lower than that of an inorganic external additive such as silica, and thus the difference in hardness between the polyalkylsilsesquioxane fine particles and the surface of the toner particles is small; burying in toner particle surface on account of durable use can be suppressed as a result.

SUMMARY OF THE INVENTION

Burying of the external additive fine particles into the toner to which the polyalkylsilsesquioxane fine particles are externally added is thus suppressed, and hence good developing performance, transferability and flowability can be maintained throughout the durable use of the toner.

It has however been found that using polyalkylsilsesquioxane fine particles is problematic in terms of blade cleaning performance on the surface of the photosensitive member. The underlying cause is deemed to be herein the formation of a blocking layer, derived from the external additive, at a nip portion of the cleaning blade, since polyalkylsilsesquioxane fine particles are spherical and the rollability thereof is thus excessively high.

The present disclosure provides an external additive for toner exhibiting excellent blade cleaning performance, and excellent durability stability, also when using particles of an organosilicon polymer. Further provided herein are a toner and an image forming apparatus that utilize the above external additive for toner.

The present disclosure relates to an external additive for toner, wherein
the external additive is an organosilicon polymer particle, and
defining A (nm) as the number-average particle diameter of primary particles of the external additive measured using a scanning electron microscope, and
defining B (nm) as the number-average particle diameter of the external additive measured in accordance with a centrifugal sedimentation method, the A and the B satisfy a following Expression (1):

$$1.5 \leq B/A \leq 3.0 \tag{1}.$$

The present disclosure provides an external additive for toner exhibiting excellent blade cleaning performance, and excellent durability stability. Further features of the present invention will become apparent from the following description of exemplary embodiments.

DESCRIPTION OF THE EMBODIMENTS

In the present disclosure, the notations "from XX to YY" and "XX to YY" representing a numerical value range denote, unless otherwise stated, a numerical value range that includes the lower limit and the upper limit thereof, as endpoints.

In a case where numerical value ranges are described in stages, the upper limits and the lower limits of the respective numerical value ranges can be combined arbitrarily.

Studies by the inventors have revealed that by using organosilicon polymer particles as an external additive for toner (hereinafter referred to as "toner external additive") it becomes possible to suppress embedding of the external additive in the surface of the toner particle, and to achieve better durability stability than in a case where silica is ordinarily used.

Given that silica is harder than a toner particle, a situation is accordingly brought about in which a hard object is pressed against a soft object, such that silica readily becomes buried in the toner particle surface. By contrast, organosilicon polymer particles are softer than silica and have appropriate hardness, and thus burying of the organosilicon polymer particles in the toner particle surface can be accordingly suppressed. Results of diligent research by the inventors have revealed that using the above toner external additive allows for more stable blade cleaning.

Herein $1.5 \leq B/A \leq 3.0$ is satisfied where A (nm) denotes the number-average particle diameter of primary particles, measured using a scanning electron microscope (SEM), and B (nm) denotes the number-average particle diameter, measured in accordance with a centrifugal sedimentation method (CPS), of a toner external additive which is an organosilicon polymer particle.

Herein the feature $B/A \geq 1.5$ signifies that the organosilicon polymer particles form an aggregate. In order to stably prevent toner slip-through from occurring in blade cleaning, it is deemed that a blocking layer derived from the external additive needs to be formed in the vicinity of a cleaning blade nip.

The characteristics of the external additive are important in order to stably form this blocking layer. If the external additive is excessively slippery, the external additive moves too speedily, and is unsuitable for forming a blocking layer. A required characteristic in order to form a blocking layer as an external additive is cohesiveness in that mutual movement of external additive particles is suppressed when these join together. Even in the case of a highly slippery external additive on account of the spherical shape of the primary particles of the external additive, a stable blocking layer with suppressed rollability between external additive particles can however be formed by virtue of the fact that the primary particles aggregate according to the relationship B/A≥1.5.

If on the other hand cohesive forces are made excessively high and accordingly the number of external additive particles that slip through the cleaning blade nip portion is excessively small, to the extreme, the friction coefficient with the surface of the photosensitive member at the portion of the blade nip becomes too high, and blade vibration and tuck-up may occur. For instance such phenomena are prone to occur in aggregated silica produced in accordance with a firing method.

By contrast, the above toner external additive does not aggregate as firmly as aggregated silica. It is deemed that, as a result, when the friction coefficient of the blade increases in the vicinity of the nip portion, giving rise to a blade draw-in movement, pressure acts as a result on the external additive that is present closest to the nip portion, whereupon the aggregate becomes crushed and breaks apart so as to correspond to the primary particle diameter.

It is deemed that that stable cleaning is made possible herein since the loose external additive suitably passes through the blade nip portion, and excessive increases in the friction coefficient can be thus curtailed. This loose external additive is only a small part thereof, and most of the external additive remains in the form of aggregates; formation of a blocking layer is therefore stable.

The relationship between the number-average particle diameter A (nm) and the number-average particle diameter B (nm) of the primary particles needs to obey B/A≤3.0. If B/A exceeds 3.0, the aggregates become too large, the blocking layer becomes rougher, and cleaning stability is impaired. Moreover, the external additive does not adhere readily to the toner particle at the time of external addition, and a preferred coating state may fail to be formed.

Herein B/A is preferably from 1.7 to 2.5, more preferably from 1.8 to 2.2.

Further, B/A can be controlled on the basis of the concentration of an organosilicon compound and the stirring conditions in the step of forming the organosilicon polymer particles. Methods for increasing B/A include methods that involve increasing the concentration of the organosilicon compound, and/or reducing the stirring force.

The number-average particle diameter A (nm) of the primary particles of the organosilicon polymer particles is preferably 40≤A≤150, more preferably 50≤A≤110.

Prescribing the above ranges is advantageous in terms of making the external additive less likely to slip through the blade nip portion, and forming the blocking layer, which as a result allows achieving a yet better blade cleaning performance. When the average diameter of the primary particles is 40 nm or larger, the particle diameter does not become too small when the above-described aggregates break apart, and thus the amount of particles that slip through the blade nip is appropriate, and a more stable cleaning property can be achieved. The above average diameter is also preferable from the viewpoint of suppressing burying of the external additive.

Even when setting A≤150, the amount slip-through of the external additive through the blade nip when the aggregates break apart is however an appropriate amount, and a good coating state of the toner can be readily achieved.

The number-average particle diameter B (nm) measured in accordance with a centrifugal sedimentation method (CPS) is preferably from 80 nm to 350 nm, and more preferably from 150 nm to 230 nm.

The Young's modulus of the organosilicon polymer particles is preferably from 1000 MPa to 30000 MPa, more preferably from 1400 MPa to 9000 MPa. The yield point stress of the organosilicon polymer particles is preferably from 1000 MPa to 10000 MPa, more preferably from 1100 MPa to 2000 MPa. By setting the above ranges it becomes possible to suppress burying of the external additive in the toner particle surface, and achieving yet better durability stability.

The Young's modulus and the yield point stress of the organosilicon polymer particles can be controlled on the basis of the number of reactive groups of the organosilicon polymer. Among the organosilicon compounds used in the production of organosilicon polymer particles, the higher the proportion of tetrafunctional silane, the stronger the resulting structure is, and the above values increase as a result, whereas the lower the proportion of organosilicon compounds having few reactive groups, the lower the above values become.

The half width of the number particle size distribution of the organosilicon polymer particles measured in accordance with a centrifugal sedimentation method is preferably from 50 nm to 150 nm, more preferably from 50 nm to 120 nm. A preferred cohesiveness of the external additive can be achieved by setting the half width to be 50 nm or larger. Yet better cohesiveness of the external additive and slip-through properties at the time of external additive breakup are brought out by setting half width to be 150 nm or less.

The half width can be controlled on the basis of the concentration of the organosilicon compound in the step of forming the organosilicon polymer particles. The half width can be made larger by increasing the primary particle diameter of the organosilicon polymer particles.

The toner comprises a toner particle containing a binder resin and an external additive; the external additive is preferably the above toner external additive.

The content of the toner external additive is preferably from 1.0 part by mass to 10.0 parts by mass, more preferably from 2.0 parts by mass to 8.0 parts by mass, relative to 100 parts by mass of the toner particle.

Superior blade cleaning performance and durability stability can be achieved by setting the above ranges. The necessary external additive amount for forming the blocking layer can be ensured reliably by prescribing the content of the toner external additive to be 1.0 part by mass or larger. Further, good durability stability that allows suppressing member contamination by the external additive can be achieved by prescribing the content to be 10.0 parts by mass or less.

The coverage ratio of the toner particle by the toner external additive which is organosilicon polymer particles is preferably from 30 area % to 70 area %, more preferably from 45 area % to 60 area %. The attachment force of the toner can be reduced, and good durability stability can be achieved, by setting the coverage ratio to be 30 area % or higher. Further, external additive surplus and member contamination can be suppressed by setting the coverage ratio to be 70 area % or lower.

The coverage ratio can be controlled on the basis of the addition amount of the organosilicon polymer particles.

The fixing ratio of the toner external additive onto the toner particle is preferably from 30% to 80%, more preferably from 40% to 60%. Member contamination can be suppressed to a greater degree, and better durability stability can be obtained, by setting the fixing ratio to be 30% or higher. The amount of external additive necessary for forming a blocking layer is ensured more reliably by setting the fixing ratio to be 80% or lower.

The fixing ratio can be controlled on the basis of external addition conditions.

The fixing ratio can be improved by increasing the rotational speed of an external addition device, and/or by lengthening the external addition time. The fixing ratio can be raised also by heating at the time of external addition.

An image forming apparatus in which the above toner can be used is not particularly limited.

The above toner is preferably used in an image forming apparatus having a cleaning member that removes the toner from an image bearing member (photosensitive member) that supports the toner.

The cleaning member is a blade formed of an elastic body; preferably, the blade is pressed against the image bearing member so that the blade swings about a swing fulcrum.

The method for supporting the cleaning blade may involve a swing-type support method in which the blade is pressed, against the photosensitive member, so as to swing about the swing fulcrum, or a fixed-type support method in which the blade does not swing. The swing-type is preferable in order to further improve toner slip-through. A swing-type support method has a greater functionality in terms of tracking the surface of the photosensitive member, and hence translates into better cleaning performance against slip-through.

The pressing force of the cleaning blade onto the image bearing member is preferably from 20 gf/cm to 40 gf/cm, in terms of linear pressure on the image bearing member. The cleaning blade nip is stably formed by setting the pressing force to be 20 gf/cm or higher. By setting the pressing force to be 40 gf/cm or less, a high-durability cleaning system is obtained in which wear/scratches on the photosensitive member are suppressed.

The elastic body used in the blade is not particularly limited, and a known elastic body used in cleaning blades can be utilized herein. Examples of the elastic body include rubber blades.

Other features of the image forming apparatus are not particularly limited, so long as a blade is used as a cleaning member in the image forming apparatus. For instance the image forming apparatus may be a known apparatus that has an image bearing member and a developing means for forming a toner image on the surface of the image bearing member.

Method for Producing the Toner External Additive

The toner external additive is herein organosilicon polymer particles. The organosilicon polymer particles have an organosilicon polymer. The organosilicon polymer has a structure in which silicon atoms and oxygen atoms are bonded alternately. The organosilicon polymer particles preferably contain 90 mass % or more of an organosilicon polymer, relative to the organosilicon polymer particles.

The method for producing the organosilicon polymer particles is not particularly limited, and for instance the organosilicon polymer particles may be obtained through dropping of a silane compound onto water, to elicit hydrolysis and a condensation reaction mediated by a catalyst, followed by filtration and drying of the obtained suspension. Particle diameter can be controlled on the basis of for instance the type of the catalyst, the compounding ratio, the reaction start temperature and the dropping time.

Examples of the catalyst include, although not limited thereto, acidic catalysts such as hydrochloric acid, hydrofluoric acid, sulfuric acid and nitric acid, and basic catalysts such as aqueous ammonia, sodium hydroxide and potassium hydroxide.

The organosilicon polymer particles are preferably produced in accordance with the method below.

Specifically, the method preferably includes a first step of obtaining a hydrolysis product of an organosilicon compound such as an organotrialkoxysilane; a second step of mixing the resulting hydrolysis product and an alkaline aqueous medium, to elicit a polycondensation reaction of the hydrolysis product; and a third step of mixing the polycondensation reaction product and an aqueous solution, to elicit particle formation.

In some cases, hydrophobicized spherical organosilicon polymer particles may be obtained by further mixing a hydrophobic agent into a dispersion of spherical organosilicon polymer particles.

In the first step, an organosilicon compound such as organotrialkoxysilane is brought into contact, in accordance with a method such as stirring or mixing, with a catalyst in an aqueous solution in which an acidic or alkaline substance serving as the catalyst is dissolved in water.

A known catalyst can be suitably used as the catalyst. Specific examples of acidic catalysts as the catalyst include hydrochloric acid, hydrofluoric acid, sulfuric acid and nitric acid, while examples of basic catalysts include aqueous ammonia, sodium hydroxide and potassium hydroxide.

The use amount of the catalyst may be adjusted as appropriate depending on the types of the organosilicon compound and of the catalyst. Preferably, the amount of catalyst is selected from within the range of $1 \times 10^{-3}$ to 1 part by mass relative to 100 parts by mass as the amount of water used for hydrolysis of the organosilicon compound.

The reaction proceeds sufficiently when the use amount of the catalyst is $1 \times 10^{-3}$ parts by mass or more. On the other hand, when the use amount of the catalyst is 1 part by mass or less, the concentration remaining as impurities in the fine particles is low, and hydrolysis is readily elicited. The use amount of water is preferably from 2 to 15 mol relative to 1 mol of the organosilicon compound. The hydrolysis reaction proceeds sufficiently when the amount of water is 2 mol or more, while productivity is improved when the amount of water is 15 mol or less.

The reaction temperature is not particularly limited, and the reaction may be conducted at normal temperature or in a heated state, but preferably the reaction is conducted in a state where the temperature is held at from 10 to 60° C., since in that case the hydrolysis product is obtained in a short time and partial condensation reactions of the generated hydrolysis product can be suppressed.

The reaction time is not particularly limited, and may be selected as appropriate taking into consideration the reactivity of the organosilicon compound that is used, the composition of the reaction solution resulting from formulating the organosilicon compound, the acid and water, and productivity.

In the method for producing the organosilicon polymer particles, the second step involves mixing the starting solution obtained in the first step and an alkaline aqueous medium, to elicit a polycondensation reaction of a particle precursor. A polycondensation reaction solution is obtained as a result. The alkaline aqueous medium is a solution obtained by mixing an alkaline component, water and, as needed, an organic solvent or the like.

The alkaline component used in the alkaline aqueous medium exhibits basicity, and acts as a neutralizer of the catalyst used in the first step, and as a catalyst of the polycondensation reaction in the second step. Examples of such alkaline components include alkali metal hydroxides such as lithium hydroxide, sodium hydroxide and potassium hydroxide; ammonia; and organic amines such as monomethylamine and dimethylamine.

The use amount of the alkaline component is an amount such that the alkaline component neutralizes an acid and effectively acts as a catalyst of the polycondensation reaction; in a case for instance where ammonia is used as the alkaline component, the amount of the alkaline component may ordinarily be selected within the range from 0.01 mass % to 12.5 mass % relative to 100 parts by mass of the mixture with water and the organic solvent.

In the second step, an organic solvent may be further used in addition to the alkaline component and water, in order to prepare the alkaline aqueous medium. The organic solvent is not particularly limited, so long as it is compatible with water, but an organic solvent is preferable herein that dissolves 10 g or more of water per 100 g at normal temperature and a normal pressure.

Specific examples of the organic solvent include alcohols such as methanol, ethanol, n-propanol, 2-propanol and butanol; polyhydric alcohols such as ethylene glycol, diethylene glycol, propylene glycol, glycerine, trimethylolpropane and hexanetriol; ethers such as ethylene glycol monoethyl ether, acetone, diethyl ether, tetrahydrofuran and diacetone alcohol; and amide compounds such as dimethylformamide, dimethylacetamide and N-methylpyrrolidone.

Alcohol solvents such as methanol, ethanol, 2-propanol or butanol are preferable among the organic solvents enumerated above. In terms of hydrolysis and a dehydration condensation reaction, it is more preferable to select, as the organic solvent, the same alcohol as the alcohol that is eliminated.

The third step involves mixing the polycondensation reaction product obtained in the second step with an aqueous solution, to elicit formation of particles.

Water (tap water, pure water or the like) can be suitably used herein as the aqueous solution, but components that are compatible with water, such as salts, acids, alkalis, organic solvents, surfactants or water-soluble polymers may be further added to the water. The temperatures of the polycondensation reaction solution and of the aqueous solution at the time of mixing are not particularly limited, and herein a range from 5 to 70° C. is suitably selected taking into consideration for instance the composition of the solutions, and productivity.

The polycondensation reaction product and the aqueous solution are mixed using a stirring blade or the like, such that B/A can be controlled on the basis of this stirring force. When the stirring force is made weaker, the dispersibility of the polycondensation reaction product decreases, and B/A can be increased. A preferred stirring force is for instance from 100 rpm to 1000 rpm in a case where a 2000 ml beaker scale is used, with a propeller having a diameter of D50 mm.

Further B/A can be controlled, so as to rise, by increasing the concentration of the polycondensation reaction product (organosilicon polymer).

The concentration of the condensation polymerization reaction product (organosilicon polymer) at the time of mixing of the polycondensation reaction product with an aqueous solution in the particle formation step is preferably from 3.5 mass % to 10.0 mass %. An aggregation state with B/A≥1.5 is readily achieved when the concentration is 3.5 mass % or higher. By contrast, B/A is readily controlled to B/A≤3.0 when the concentration is 10.0 mass % or lower.

A known method may be adopted, without particular limitations, as the method for recovering the organosilicon polymer particles. For instance a floating powder may be scooped or filtered, but filtration is preferable since the operation involved is simple and convenient.

The filtration method is not particularly limited, and a known apparatus for vacuum filtration, centrifugal filtration, pressure filtration or the like may be selected herein. The filter paper, filter, filter cloth or the like used for filtration are not particularly limited so long these are industrially available, and may be selected as appropriate depending on the apparatus that is used.

The hydrophobicity of the organosilicon polymer particles may be adjusted by treating the surface of the organosilicon polymer particles using a known means such as a silane coupling agent or silicone oil.

From the viewpoint of achieving a stable triboelectric charge quantity, the hydrophobicity of the organosilicon polymer particles is preferably from 40 to 80%, more preferably from 50 to 80%.

The average circularity of the toner external additive is preferably from 0.50 to less than 0.80, and more preferably from 0.60 to 0.74, so that the toner external additive readily aggregates to some extent.

The average circularity can be controlled on the basis of the stirring force at the time of particle formation, and the concentration of the organosilicon polymer.

Average circularity is measured as follows.

The average circularity is determined by analyzing the image data obtained by a field emission scanning electron microscope (S-4800, Hitachi High-Technologies Co., Ltd.) (FE-SEM) with image analysis software (ImageJ (developer Wayne Rasband)), as a result of a calculation on the basis of the perimeter and the projected area of the organosilicon polymer particles. Specifically, a 50% circularity at a cumulative frequency of 50% of circularity, calculated in accordance with the expression below, is applied to 100 particles obtained as a result of the above image analysis.

$$\text{Circularity}=4\pi\times(A/I^2)$$

(In the expression, I represents the perimeter (nm) of a primary particle on the image, and A represents the projected area (nm$^2$) of the primary particle)

The FE-SEM observation is performed in a state resulting from external addition of the organosilicon polymer particles to the toner particle.

The organosilicon polymer particle is preferably a condensation polymer of an organosilicon compound having the structure represented by the following formula (2).

($R^2$, $R^3$, $R^4$, and $R^5$ in formula (2) each independently represent an alkyl group having 1 to 6 (preferably 1 to 3 and more preferably 1 or 2) carbons, a phenyl group, or a reactive group (for example, a halogen atom, hydroxy group, acetoxy group, or an alkoxy group (having preferably 1 to 6 carbons and more preferably 1 to 3 carbons)).)

An organosilicon compound having four reactive groups in each formula (2) molecule (tetrafunctional silane), an organosilicon compound having in formula (2) an alkyl group or phenyl group for $R^2$ and three reactive groups ($R^3$, $R^4$, $R^5$) (trifunctional silane), an organosilicon compound having in formula (2) an alkyl group or phenyl group for $R^2$ and $R^3$ and two reactive groups ($R^4$, $R^5$) (difunctional silane), and an organosilicon compound having in formula (2) an alkyl group or phenyl group for $R^2$, $R^3$, and $R^4$ and one reactive group ($R^5$) (monofunctional silane) can be used to obtain the organosilicon polymer particles. The use of at least 50 mol % trifunctional silane for the organosilicon compound is preferred.

The organosilicon polymer particle can be obtained by causing the reactive groups to undergo hydrolysis, addition polymerization, and condensation polymerization to form a crosslinked structure. The hydrolysis, addition polymerization, and condensation polymerization of $R^3$, $R^4$, and $R^5$ can be controlled using the reaction temperature, reaction time, reaction solvent, and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

Binder Resin

The binder resin used in the toner is not particularly limited, and for instance the following polymers can be used.

For example monopolymers of styrene and substituted styrene, such as polystyrene, poly-p-chlorostyrene and polyvinyltoluene; styrene copolymers such as styrene-p-chlorostyrene copolymer, styrene-vinyltoluene copolymer, styrene-vinylnaphthalene copolymer, styrene-acrylate ester copolymers, styrene-methacrylate ester copolymers, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer and styrene-acrylonitrile-indene copolymer; and polyvinyl chloride, phenol resin, natural resin-modified phenol resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinylbutyral resin, terpene resin, coumarone-indene resin and petroleum-based resin may be used.

Preferred among the foregoing are polyester resins, from the viewpoint of durability stability and charging stability.

Colorant

A colorant may be used in the toner particle. The colorant may also be contained in the toner particle. The following are examples of colorants.

Examples of black colorants include carbon black, and blacks obtained by color adjustment of blending yellow, magenta and cyan colorants. A pigment may be used alone as the colorant, but from the standpoint of image quality with full-color images, preferably a dye and a pigment are used together to improve the color clarity.

Examples of magenta pigments include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of magenta dyes include C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; oil-soluble dyes such as C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39 and 40 and C.I. Basic Violet 1, 3, 7, 10, 14, 15, 21, 25, 26, 27 and 28.

Examples of cyan pigments include C.I. Pigment Blue 2, 3, 15:2, 15:3, 15:4, 16 and 17; C.I. Vat Blue 6; C.I. Acid Blue 45, and copper phthalocyanine pigments having 1 to 5 phthalimidomethyl groups substituted on a phthalocyanine skeleton.

Examples of cyan dyes include C.I. Solvent Blue 70.

Examples of yellow pigments include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3, and 20.

Examples of yellow dyes include C.I. Solvent Yellow 162.

The content of the colorant is preferably from 0.1 to 30 mass parts per 100 mass parts of the binder resin.

Wax

Wax may be used in the toner particle. Examples of waxes include the following.

Examples of the wax include the following: hydrocarbon waxes such as microcrystalline wax, paraffin wax and Fischer-Tropsch wax; hydrocarbon wax oxides such as polyethylene oxide wax, and block copolymers of these; waxes consisting primarily of fatty acid esters, such as carnauba wax; and partially or fully deoxidized fatty acid esters, such as deoxidized carnauba wax.

Other examples include the following: saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, seryl alcohol and melissyl alcohol; polyvalent alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, seryl alcohol and mellisyl alcohol; fatty acid amides such as linoleamide, oleamide and lauramide; saturated fatty acid bisamides such as methylenebis stearamide, ethylenebis capramide, ethylenebis lauramide and hexamethylenebis stearamide; unsaturated fatty acid amides such as ethylenebis oleamide, hexamethylenebis oleamide, N,N'-dioleyladipamide and N,N'-dioleylsebacamide; aromatic bisamides such as m-xylenebis stearamide and N,N'-distearylisophthalamide; aliphatic metal salts (commonly called metal soaps) such as calcium stearate, calcium laurate, zinc stearate and magnesium stearate; aliphatic hydrocarbon waxes grafted with vinyl monomers such as styrene or acrylic acid; partially esterified products of fatty acids and polyvalent alcohols, such as behenic acid monoglyceride; and methyl ester compounds with hydroxyl groups obtained by hydrogenation of plant-based oils and fats.

The content of the wax is preferably from 2.0 parts by mass to 30.0 parts by mass, relative to 100 parts by mass of the binder resin.

Charge Control Agent

A charge control agent may be included as necessary in the toner particle. A known charge control agent may be used, but a metal compound of an aromatic carboxylic acid is especially desirable because it is colorless and yields a toner particle that has a rapid charging speed and can stably maintain a fixed charge quantity.

Examples of negatively-charging charge control agents include salicylic acid metal compounds, naphthoic acid metal compounds, dicarboxylic acid metal compounds, polymeric compounds having sulfonic acids or carboxylic acids in the side chains, polymeric compounds having sulfonic acid salts or sulfonic acid esters in the side chains, polymeric compounds having carboxylic acid salts or carboxylic acid esters in the side chains, and boron compounds, urea compounds, silicon compounds and calixarenes.

The charge control agent may be added either internally or externally to the toner base particle. The added amount of the charge control agent is preferably from 0.2 parts by mass to 10 parts by mass per 100 parts by mass of the binder resin.

Inorganic Fine Particles

Besides the above-described toner external additive, other inorganic fine particles can be used concomitantly, as needed.

The inorganic fine particles may be internally added to the toner particle or may be mixed, as an external additive, with the toner particle. Inorganic fine particles such as silica are preferable as the external additive. The inorganic fine particles are preferably hydrophobized with a hydrophobic agent such as a silane compound, silicone oil, or a mixture thereof.

Inorganic fine particles having a specific surface area from 50 $m^2/g$ to 400 $m^2/g$ are preferable as the external additive. Flowability and charging performance can be finely adjusted by using concomitantly inorganic fine particles having a specific surface area lying in the above range. The effect of the organosilicon polymer particles is still brought out also when using inorganic fine particles concomitantly.

Preferably, there are used from 0.1 parts by mass to 10.0 parts by mass of the above inorganic fine particles relative to 100 parts by mass of the toner particle.

The content of the above-described toner external additive is preferably from 50 mass % to 100 mass %, more preferably from 80 mass % to 100 mass %, and yet more preferably from 90 mass % to 100 mass %, relative to the external additive as a whole.

Developer

The toner can be used as a single-component developer, but may also be used as a two-component developer by being mixed with a magnetic carrier, in order to further improve dot reproducibility and in order to supply stable images over long periods of time.

Specifically, preferred herein is a two-component developer containing a toner and a magnetic carrier, where the toner is the above toner.

As the magnetic carrier there can be used generally known magnetic carriers such as surface-oxidized iron powders or non-oxidized iron powders; metal particles such as iron, lithium, calcium, magnesium, nickel, copper, zinc, cobalt, manganese, chromium and rare earth particles, and alloy particles and oxide particles of the foregoing; as well as magnetic bodies such as ferrite, and magnetic body-dispersed resin carriers (so-called resin carriers) containing a magnetic body and a binder resin that holds therein the magnetic body in a dispersed state.

Preferably, the mixing ratio of the magnetic carrier and the toner is such that the toner concentration in the two-component developer is from 2 mass % to 15 mass %, more preferably from 4 mass % to 13 mass %.

Method for Producing a Toner Particle

The method for producing the toner particle is not particularly limited, and a known production method such as suspension polymerization, emulsification aggregation, melt-kneading or dissolution suspension can be resorted to.

A toner can then be obtained by mixing the above toner external additive, and other external additives as needed, with the obtained toner particle.

Mixing of the toner particle and the external additive can be accomplished using a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

The Young's modulus of the toner particle is preferably from 2000 MPa to 9000 MPa, from the viewpoint of the durability stability and the charging stability of the toner.

The yield point stress of the toner particle is preferably from 500 MPa to 10000 MPa, from the viewpoint of the durability stability and the charging stability of the toner.

Methods for measuring various physical properties will be explained below.

Method for Measuring the Number-Average Particle Diameter A of Primary Particles of a Toner External Additive The number-average particle diameter A of the primary particles of the toner external additive can be determined on the basis of a measurement using a scanning electron microscope "5-4800" (product name; by Hitachi Ltd.).

From an image resulting from capturing external additive particles there are randomly selected 100 organosilicon polymer particles, the major axis of primary particles of the fine particles is measured, and the arithmetic mean value of the measured values is taken as the number-average particle diameter of the particles.

The observation magnifications may be adjusted as appropriate depending on the size of the organosilicon polymer particles.

Case where the Toner Contains Another External Additive

The number-average particle diameter A from the toner can be measured by resorting to the above means, but in a case where the toner contains another external additive, besides the organosilicon polymer, the measurement is performed in accordance with the method below, by distinguishing the other external additive from the organosilicon polymer particles.

When the toner contains silicon-containing material other than the organosilicon polymer particles, EDS analysis is carried out on the individual particles of the external additive during observation of the toner and the determination is made, based on the presence/absence of a peak for the element Si, as to whether the analyzed particles are organosilicon polymer particles.

When the toner contains both organosilicon polymer particles and silica fine particles, the organosilicon polymer particles are identified by comparing the ratio (Si/O ratio) for the Si and O element contents (atomic %) with a standard. EDS analysis is carried out under the same conditions on standards for both the organosilicon polymer particles and silica fine particles to obtain the element content (atomic %) for both the Si and O. Using A for the Si/O ratio for the organosilicon polymer particles and B for the Si/O ratio for the silica fine particles, measurement conditions are selected whereby A is significantly larger than B. Specifically, the measurement is run ten times under the same conditions on the standards and the arithmetic mean value is obtained for both A and B. Measurement conditions are selected whereby the obtained average values satisfy A/B>1.1.

When the Si/O ratio for a fine particle to be classified is on the A side from [(A+B)/2], the fine particle is then scored as an organosilicon polymer particle.

Tospearl 120A (Momentive Performance Materials Japan LLC) is used as the standard for the organosilicon polymer particles, and HDK V15 (Asahi Kasei Corporation) is used as the standard for the silica fine particles.

Method for Measuring the Number-Average Particle Diameter B of the Toner External Additive in Accordance with a Centrifugal Sedimentation Method The number-average particle diameter B of toner external additive particles is measured in accordance with a centrifugal sedimentation method. Specifically, 0.01 g of dried external additive particles are placed in a 25 ml glass vial, and 0.2 g of a 5% Triton solution and 19.8 g of RO water are added thereto, to produce a solution.

Next, the probe (the tip within the leading end) of an ultrasonic disperser is immersed in that solution, to elicit ultrasonic dispersion at an output of 20 W for 15 minutes, and obtain a dispersion as a result. The number-average particle diameter is measured next, using this dispersion, with the help of a centrifugal sedimentation particle size distribution measuring device DC24000 by CPS Instruments Inc. Disc rotational speed is set to 18000 rpm, and true density is set to 1.3 g/cm$^3$. Prior to measurement, the device is calibrated using polyvinyl chloride particles having an average particle diameter of 0.476 μm.

Calculation of a Half Width of a Number Particle Size Distribution

The half width may be calculated from a number particle size distribution obtained in the above measurement, with the horizontal axis representing particle diameter and the vertical axis representing number frequency. The width for a particle diameter at fmax/2, where fmax is the number of peak number frequency, is taken as the half width.

Separation of the External Additive from the Toner

Various physical properties can also be measured using an external additive separated from the toner in accordance with the method below.

Herein 1 g of toner is added to 31 g of chloroform in a vial, and is dispersed therein. Dispersion involves a treatment for 30 minutes using an ultrasonic homogenizer, to prepare a dispersion. The treatment conditions are as follows.

Sonication device: ultrasonic homogenizer VP-050 (by Titec Corporation)

Microchip: step-type microchip, tip diameter ø2 mm

Microchip tip position: central portion of glass vial, at a 5 mm height from the bottom Ultrasonic conditions: intensity 30%, 30 minutes Herein ultrasonic waves are applied while cooling the vial with ice water, so that the temperature of the dispersion does not rise.

The dispersion is then transferred to a glass tube (50 mL) for swing rotors, and is centrifuged under conditions of 58.33 s$^{-1}$ for 30 minutes, using a centrifuge (H-9R, by Kokusan Co. Ltd.). Each material that makes up the toner becomes separated in the glass tube after centrifugation. The external additive is extracted and dried under vacuum conditions (40° C./24 hours).

Ascertainment of the Structure of Organosilicon Polymer Particles

Herein a pyrolysis gas chromatography mass spectrometer (hereinafter referred to as pyrolysis GC/MS) and NMR are utilized to identify the compositions and ratios of the constituent compounds of the organosilicon polymer particles (toner external additive).

Pyrolysis GC/MS is used for analysis of the species of constituent compounds of the organosilicon polymer particles.

The species of constituent compounds of the organosilicon polymer particles are identified by analysis of the mass spectrum of the pyrolyzate components derived from the organosilicon polymer particles and produced by pyrolysis of the organosilicon polymer particles at 550° C. to 700° C.

Measurement Conditions for Pyrolysis GC/MS pyrolysis instrument: JPS-700 (Japan Analytical Industry Co., Ltd.)

pyrolysis temperature: 590° C.

GC/MS instrument: Focus GC/ISQ (Thermo Fisher)

column: HP-5MS, 60 m length, 0.25 mm inner diameter, 0.25 μm film thickness injection port temperature: 200° C.

flow pressure: 100 kPa split: 50 mL/min

MS ionization: EI ion source temperature: 200° C., 45 to 650 mass range

The abundance of the identified constituent compounds of the organosilicon polymer particles is then measured and calculated using solid-state $^{29}$Si-NMR.

In solid-state $^{29}$Si-NMR, peaks are detected in different shift regions depending on the structure of the functional groups bonded to the Si in the constituent compounds of the organosilicon polymer particles.

The structure of the functional groups of each peak can be identified by using a reference sample. The abundance of each constituent compound can be calculated from the obtained peak areas.

The measurement conditions for the solid-state $^{29}$Si-NMR are as follows.
instrument: JNM-ECX5002 (JEOL RESONANCE)
temperature: room temperature
measurement method: DDMAS method, $^{29}$Si, 45°
sample tube: zirconia 3.2 mmφ
sample: filled in powder form into the sample tube
sample rotation rate: 10 kHz
relaxation delay: 180 s
scans: 2000

After this measurement, peak separation is performed, for the chloroform-insoluble matter of the organosilicon polymer particles, into the following structure X1, structure X2, structure X3, and structure X4 by curve fitting for silane components having different substituents and bonding groups, and their respective peak areas are calculated.

$$\text{structure X1:}(Ri)(Rj)(Rk)SiO_{1/2} \quad (A1)$$

$$\text{structure X2:}(Rg)(Rh)Si(O_{1/2})_2 \quad (A2)$$

$$\text{structure X3:}RmSi(O_{1/2})_3 \quad (A3)$$

$$\text{structure X4:}Si(O_{1/2})_4 \quad (A4)$$

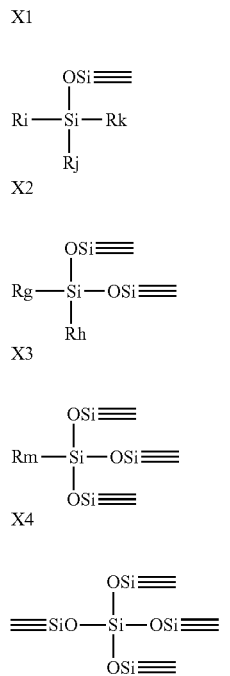

The Ri, Rj, Rk, Rg, Rh, and Rm in formulas (A1), (A2), and (A3) represent a silicon-bonded organic group, e.g., a hydrocarbon group having from 1 to 6 carbons, halogen atom, hydroxy group, acetoxy group, or alkoxy group.

The hydrocarbon group bonded to the Si is identified by $^{13}$C-NMR.

Measurement Conditions for $^{13}$C-NMR (Solid State)
instrument: JNM-ECX500II from JEOL RESONANCE, Inc.
sample tube: 3.2 mmφ
sample: filled in powder form into the sample tube
measurement temperature: room temperature
pulse mode: CP/MAS
measurement nucleus frequency: 123.25 MHz ($^{13}$C)
reference material: adamantane (external reference: 29.5 ppm)
sample rotation rate: 20 kHz
contact time: 2 ms
retardation time: 2 s
number of integrations: 1024

In this method, the hydrocarbon group is confirmed by the presence/absence of a signal originating with, e.g., the silicon atom-bonded methyl group (Si—CH$_3$), ethyl group (Si—C$_2$H$_5$), propyl group (Si—C$_3$H$_7$), butyl group (Si—C$_4$H$_9$), pentyl group (Si—C$_5$H$_{11}$), hexyl group (Si—C$_6$H$_{13}$), or phenyl group (Si—C$_6$H$_5$).

When a finer structural discrimination is necessary, identification may be carried out using the results of $^1$H-NMR measurement together with the results of the aforementioned $^{13}$C-NMR measurement and $^{29}$Si-NMR measurement.

Method for Measuring the Softening Temperature (Tm) of the Binder Resin

The softening temperature of the resin is measured using a capillary rheometer of constant-load extrusion type, "Flow characteristic evaluation device Flowtester CFT-500D" (by Shimadzu Corporation), according to the manual ancillary to the device. In this device, a measurement sample packed into a cylinder is melted by being warmed up while under application of a constant load from the top of the measurement sample, by means of a piston, and the melted measurement sample is then extruded from a die at the bottom of the cylinder, such that a flow curve can be obtained that denotes a relationship between the piston downstroke at this time and temperature.

The softening temperature (Tm) in the present disclosure is the "melting temperature in the ½ method" set forth in the manual ancillary to the "Flow characteristic evaluation device Flowtester CFT-500D". The melting temperature in the ½ method is calculated as follows.

First, ½ of the difference between the piston stroke at the completion of outflow (outflow completion point, designated as Smax) and the piston stroke at the start of outflow (lowest point, designated as Smin) is determined (this is designated as X, where X=(Smax−Smin)/2). The temperature of the flow curve when the piston stroke reaches the sum of X and Smin is taken to be the melting temperature by the ½ method.

The measurement sample used is prepared by subjecting 1.0 g of the resin to compression molding for 60 seconds at 10 MPa in a 25° C. environment using a tablet compression molder (for example, the NT-100H Standard Manual Newton Press, NPa System Co., Ltd.) to provide a cylindrical shape with a diameter of 8 mm.

The specific measurement procedure is carried out according to the manual provided with the instrument.

The measurement conditions with the CFT-500D are as follows.
test mode: ramp-up method
start temperature: 50° C.
saturated temperature: 200° C.
measurement interval: 1.0° C.
ramp rate: 4.0° C./min
piston cross section area: 1.000 cm$^2$
test load (piston load): 10.0 kgf (0.9807 MPa)
preheating time: 300 seconds
diameter of die orifice: 1.0 mm
die length: 1.0 mm Method for Measuring the Weight-Average Particle Diameter (D4) of the Toner Particle The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-μm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis.

In the "modify the standard operating method (SOM)" screen in the dedicated software, the total count number in the control mode is set to 50000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm.

The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added approximately 0.3 mL of the dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) as a dispersing agent.

(3) A prescribed amount of deionized water is introduced into the water tank of the ultrasound disperser "Ultrasonic Dispersion System Tetora 150" (Nikkaki Bios Co., Ltd.), which has an electrical output of 120 W and is equipped with two oscillators (oscillation frequency=50 kHz) disposed such that the phases are displaced by 180°, and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50000.

(7) The measurement data is analyzed by the dedicated software provided with the instrument and the weight-average particle diameter (D4) is calculated. When set to graph/volume % with the dedicated software, the "average diameter" on the analysis/volume statistical value (arithmetic average) screen is the weight-average particle diameter (D4).

Method for Measuring the Coverage Ratio

A toner surface image captured using a scanning electron microscope "S-4800" (product name; by Hitachi Ltd.) is analyzed using the image analysis software Image-Pro Plus ver. 5.0 (by Nippon Roper KK), to calculate the coverage ratio.

The image capturing conditions for S-4800 are as follows.

(1) Sample Preparation

A thin layer of conductive paste is applied to a sample table (aluminum sample table 15 mm×6 mm), and the toner is deposited thereon. Using a blower, the excess toner is air blown followed by sufficient drying. The sample stage is set on the sample holder, and the height of the sample stage is adjusted to 36 mm with a sample height gauge.

(2) S-4800 Observation Condition Setting

Liquid nitrogen is poured until overflowing into an anti-contamination trap attached to the case of the S-4800, and left for 30 minutes. The "PC-SEM" of the S-4800 is operated to perform flushing (purification of FE chip electron source). The acceleration voltage display part of the control panel on the image is clicked, and the "flushing" button is pressed to open a flushing execution dialog. This is executed after the flushing strength is confirmed to be 2. The emission current from flushing is then confirmed to be 20 μA to 40 μA. The sample holder is inserted into the sample chamber of the S-4800 case. "Origin" is pressed on the control panel to transfer the sample holder to the observation position.

The acceleration voltage display part is clicked to open an HV setting dialog, and the acceleration voltage is set to "1.1 kV" and the emission current to "20 μA". In the "basic" tab of the operation panel, the signal selection is set to "SE", "upper (U)" with "+BSE" is selected as the SE detector, and "L.A. 100" is selected with the selection button to the right of "+BSE" to set the backscattered electron imaging mode. In the same "basic" tab of the operation panel, the probe current of the electronic optical system condition block is set to "Normal", the focus mode to "UHR", and WD to "4.5 mm". The "On" button of the acceleration voltage display part on the control panel is pressed to apply acceleration voltage.

(3) Calculation of Number Average Particle Diameter (D1) of Toner

The magnification is set to 5000-fold (5 k-fold) by dragging in the magnification display part of the control panel. The focus knob [COARSE] on the operation panel is rotated, and the aperture alignment is adjusted when the focus is achieved to some extent. [Align] on the control panel is clicked to display an alignment dialog, and [Beam] is selected. The STIGMA/ALIGNMENT knobs (X, Y) on the operation panel are rotated to move the displayed beam to the center of the concentric circle. Next, [Aperture] is selected, and the STIGMA/ALIGNMENT knobs (X, Y) are turned one by one to stop the movement of the image or adjust the movement to the minimum. The aperture dialog is closed and focusing is performed with auto focus. The operation is repeated two more times to focus.

Thereafter, the particle diameter of 300 toner particles is measured to determine the number average particle diameter (D1). The particle diameter of each particle is the maximum diameter when the toner particles are observed.

(4) Focus Adjustment

For the particles with a diameter within ±0.1 μm of the number average particle diameter (D1) obtained in (3), the magnification is set to 10000 (10 k) times by dragging in the magnification display part of the control panel in a state where the midpoint of the maximum diameter is aligned with the center of the measurement screen.

The focus knob [COARSE] on the operation panel is rotated, and the aperture alignment is adjusted when the focus is achieved to some extent. [Align] on the control panel is clicked to display an alignment dialog, and [Beam] is selected. The STIGMA/ALIGNMENT knobs (X, Y) on the operation panel are rotated to move the displayed beam to the center of the concentric circle.

Next, [Aperture] is selected, and the STIGMA/ALIGNMENT knobs (X, Y) are turned one by one to stop the movement of the image or adjust the movement to the minimum. The aperture dialog is closed and focusing is performed with auto focus.

After that, the magnification is set to 50000-fold (50 k-fold), the focus is adjusted using the focus knob and STIGMA/ALIGNMENT knob in the same manner as described above, and the focus is again adjusted by autofocus. This operation is repeated again to focus. Here, since the measurement accuracy of the coverage rate tends to be low when the angle of inclination of the observation surface is large, a mode is selected in which focusing is performed simultaneously on the entire observation surface when adjusting the focus, thereby performing analysis by selecting the smallest possible surface inclination.

(5) Image Storage

Brightness is adjusted in an ABC mode, and an image is captured with a size of 640×480 pixels and saved. The following analysis is performed using this image file. One image is captured for one toner particle, and an image is obtained for 25 toner particles.

(6) Image Analysis

The coverage ratio is calculated by binarizing the image obtained by the above-described method by using the following analysis software. At this time, analysis is performed by dividing one screen into 12 squares.

The analysis conditions of image analysis software Image-Pro Plus ver. 5.0 are as follows.

"Count"/"Size" and "Options" are successively selected from "Measure" in the toolbar, and the binarization condition is set. Among Segmentation Options, 8-connected is selected and smoothing is set to 0. In addition, sorting, filling holes, and inclusion lines are not selected, and "Clean Borders" is set to "None". "Measurements" is selected from "Measure" on the tool bar, and 2 to 107 is inputted as the ranges of Area in Filter Ranges.

The coverage ratio is calculated by enclosing the square region. At this time, the surface area (C) of the region is set to range from 24,000 to 26,000 pixels. The value is automatically binarized in "treatment"—binarization, to calculate a sum total (D) of the surface areas of the regions having no organosilicon polymer particles.

The coverage ratio is then worked out on the basis of the surface area C of the square region, and the sum total D of the surface areas of the regions having no organosilicon polymer particles, in accordance with the expression below.

Coverage ratio (%)=100−($D/C$×100)

The arithmetic mean value of all the obtained data is taken as the coverage ratio.

Method for Measuring the Fixing Ratio

The fixing ratio is worked out by performing a water washing treatment and evaluating the amount of external additive particles remaining on the surface of the toner particle after washing with water. Specifically, the respective coverage ratios of the toner before washing with water and of the toner after washing with water are calculated, and the "fixing ratio (%)" is given by [coverage ratio of toner after water washing]/[coverage ratio of toner before water washing]×100

Water Washing Step

Herein 20 g of a 30 mass % aqueous solution of Contaminon N (30 mass % aqueous solution of a pH-7 neutral detergent for precision measuring instruments, made up of a nonionic surfactant, an anionic surfactant and an organic builder) are weighed in a vial having a volume of 50 mL, and are mixed with 1 g of toner.

The vial is loaded in "KM Shaker" (model: V. SX) by Iwaki Industry Co., Ltd., and is shaken for 120 seconds at a speed set to 50. As a result, the organosilicon polymer particles migrate from the toner particle surface towards the dispersion, depending on the fixed state of the particles.

Thereafter, the toner and the organosilicon polymer particles having migrated to the supernatant are separated using a centrifuge (H-9R; by Kokusan Co., Ltd.) (at 16.67 $s^{-1}$ for 5 minutes).

The precipitated toner is dried by vacuum drying (40° C./24 hours), to yield a toner after water washing.

Methods for Measuring the Young's Modulus and Yield Point Stress of the Toner External Additive Particles and the Toner Particle The Young's modulus and the yield point stress of the toner external additive particles and the toner particle are determined on the basis of a micro-compression test using a Heiditron PI 85L picoindenter (by BRUKER). The Young's modulus (MPa) is calculated on the basis of the slope of a profile (stress-strain curve) of displacement (nm) and test force (μN), obtained in the measurement. The yield point stress is calculated by dividing the stress applied to the measurement indenter at the yield point by the area of the measurement surface of the measurement indenter.

Equipment/Tool

Base System: Hysitron PI-85L

Measurement Indenter: Flat end indenter with a circular tip with a diameter of 1 m SEM: Thermo Fisher Versa 3D SEM condition: −10° tilt, 13 pA at 10 keV Measurement Conditions Measurement Mode: Displacement Control Maximum displacement: 30 nm
Displacement Rate: 1 nm/sec
Retention Time: 2 seconds
Unloading Rate: 5 nm/sec
Analysis Method Hertz analysis is applied to the obtained load displacement curve when the load displacement curve is compressed by 0 nm to 10 nm, and Young's modulus and yield point stress of each particle are calculated.
Sample Preparation An external additive for toner or toner particle is attached to a silicon wafer.

EXAMPLES

The present invention will be described in more concrete terms with reference to the examples illustrated below. However, these examples are not meant to limit the present invention in any way. Unless otherwise stated, the language "parts" in the formulations below refers to parts by mass in all instances.
Production Example of Toner External Additive Particles 1
1. Hydrolysis step Herein 43.0 g of RO water and 0.008 g of acetic acid as a catalyst were charged in a 200 ml beaker, and were stirred at 45° C. Then 54.0 g of trimethoxymethylsilane were added thereto, with stirring for 1.5 hours, to obtain a starting solution.
2. Condensation Polymerization Step Herein 70.0 g of RO water, 340.0 g of methanol and 1.8 g of 25% aqueous ammonia were added to a 1000 ml beaker, with stirring at 30° C., to prepare an alkaline aqueous medium. Then the starting solution obtained in "1. Hydrolysis step" was added dropwise to the alkaline aqueous medium, over 1 minute. The resulting mixed solution after dropping of the starting solution was stirred as it was for 1.5 hours at 30° C., to allow a polycondensation reaction to proceed, whereupon a polycondensation reaction solution was obtained.
3. Particle Formation Step Herein 700 g of RO water were placed in a 2000 ml beaker, and the polycondensation reaction solution obtained in "2. Condensation polymerization step" was added dropwise over 10 minutes while under stirring at 25° C. A propeller having a diameter of (D50 mm was used for stirring, and the rotational speed was set to 200 rpm.

The polycondensation reaction solution became cloudy immediately upon mixing with water, and a dispersion was obtained that contained organosilicon polymer particles having siloxane bonds.
4. Hydrophobization Step Herein 23 g of hexamethyldisilazane as a hydrophobic agent were added to the dispersion containing the organosilicon polymer particles having siloxane bonds and obtained in "3. Particle formation step", with stirring at 60° C. for 2.5 hours. After standing for 5 minutes, the powder precipitated at the bottom of the solution was recovered by suction filtration and was dried under reduced pressure at 120° C. for 24 hours, to obtain Toner external additive particles 1.

The number-average particle diameter A of primary particle diameter measured by the SEM, of the obtained Toner external additive particles 1 was herein 90 nm. The number-average particle diameter B measured in accordance with the centrifugal sedimentation method was 180 nm. Table 1 sets out the physical properties of Toner external additive particles 1.

Production Example of Toner External Additive Particles 2

Toner external additive particles 2 were obtained in the same way as in the production example of Toner external additive particles 1, but herein the duration of dropwise addition in the particle formation step was modified to 30 minutes. Table 1 sets out the physical properties of the obtained Toner external additive particles 2.
Production Example of Toner External Additive Particles 3

Toner external additive particles 3 were obtained in the same way as in the production example of Toner external additive particles 1, but herein the RO water used in the particle formation step was modified to 500 g. Table 1 sets out the physical properties of the obtained Toner external additive particles 3.
Production Example of Toner External Additive Particles 4

Toner external additive particles 4 were obtained in the same way as in the production example of Toner external additive particles 1, but herein 54.0 g of trimethoxymethylsilane in the hydrolysis step were modified to 42.0 g of trimethoxymethylsilane plus 12.0 g of dimethyldimethoxysilane. Table 1 sets out the physical properties of the obtained Toner external additive particles 4.
Production Example of Toner External Additive Particles 5

Toner external additive particles 5 were obtained in the same way as in the production example of Toner external additive particles 1, but herein 54.0 g of trimethoxymethylsilane in the hydrolysis step were modified to 42.0 g of trimethoxymethylsilane plus 12.0 g of tetraethoxysilane. Table 1 sets out the physical properties of the obtained Toner external additive particles 5.
Production Example of Toner External Additive Particles 6

Toner external additive particles 6 were obtained in the same way as in the production example of Toner external additive particles 1, but herein the 25% aqueous ammonia used in the condensation polymerization step was modified to 1.4 g thereof. Table 1 sets out the physical properties of the obtained Toner external additive particles 6.
Production Example of Toner External Additive Particles 7

Toner external additive particles 7 were obtained in the same way as in the production example of Toner external additive particles 1, but herein the 25% aqueous ammonia used in the condensation polymerization step was modified to 2.5 g thereof. Table 1 sets out the physical properties of the obtained Toner external additive particles 7.
Production Example of Toner External Additive Particles 8

Toner external additive particles 8 were obtained in the same way as in the production example of Toner external additive particles 1, but herein the RO water used in the particle formation step was modified to 900 g, and moreover the duration of dropwise addition was modified to 30 minutes. Table 1 sets out the physical properties of the obtained Toner external additive particles 8.
Production Example of Toner External Additive Particles 9

Toner external additive particles 9 were obtained in the same way as in the production example of Toner external additive particles 1, but herein the RO water used in the particle formation step was modified to 400 g. Table 1 sets out the physical properties of the obtained Toner external additive particles 9.
Production Example of Toner External Additive Particles 10

Toner external additive particles 10 were obtained in the same way as in the production example of Toner external additive particles 1, but herein the 25% aqueous ammonia used in the condensation polymerization step was modified to 1.3 g thereof. Table 1 sets out the physical properties of the obtained Toner external additive particles 10.

Production Example of Toner External Additive Particles 11

Toner external additive particles 11 were obtained in the same way as in the production example of Toner external additive particles 1, but herein the 25% aqueous ammonia used in the condensation polymerization step was modified to 2.8 g thereof. Table 1 sets out the physical properties of the obtained Toner external additive particles 11.

Production Example of Toner External Additive Particles 12

Toner external additive particles 12 were obtained in the same way as in the production example of Toner external additive particles 1, but herein the RO water used in the particle formation step was modified to 1200 g, and moreover the duration of dropwise addition was modified to 30 minutes. Table 1 sets out the physical properties of the obtained Toner external additive particles 12.

Production Example of Toner External Additive Particles 13

Toner external additive particles 13 were obtained in the same way as in the production example of Toner external additive particles 1, but herein the RO water used in the particle formation step was modified to 1100 g, and moreover the duration of dropwise addition was modified to 20 minutes. Table 1 sets out the physical properties of the obtained Toner external additive particles 13.

Production Example of Toner External Additive Particles 14

Toner external additive particles 14 were obtained in the same way as in the production example of Toner external additive particles 1, but herein the RO water used in the particle formation step was modified to 400 g, and moreover the duration of dropwise addition was modified to 8 minutes. Table 1 sets out the physical properties of the obtained Toner external additive particles 14.

Production Example of Toner External Additive Particles 15

Herein the 25% aqueous ammonia used in the condensation polymerization step was modified to 2.5 g.

Further, the RO water used in the particle formation step was modified to 1000 g, and moreover the duration of dropwise addition was modified to 20 minutes. Other than that, Toner external additive particles 15 were obtained in the same way as in the production example of Toner external additive particles 1. Table 1 sets out the physical properties of the obtained Toner external additive particles 15.

Production Example of Toner External Additive Particles 16

Herein the 25% aqueous ammonia used in the condensation polymerization step was modified to 1.4 g.

Further, the RO water used in the particle formation step was modified to 400 g, and moreover the duration of dropwise addition was modified to 8 minutes. Other than that, the toner external additive particles 16 were obtained in the same way as in the production example of Toner external additive particles 1. Table 1 sets out the physical properties of the obtained Toner external additive particles 16.

TABLE 1

| Toner external additive particles No. | Hydrolysis step Silane compound | | Particle formation step | | External additive properties | | | | | | |
|---|---|---|---|---|---|---|---|---|---|---|---|
| | | | conc. mass % | Dropping time min | A nm | B nm | B/A | Half width nm | Young's modulus Mpa | Yield point stress Mpa | Average circularity |
| 1 | Trimethoxy methylsilane | | 4.5 | 10 | 90 | 180 | 2.0 | 80 | 6000 | 1500 | 0.65 |
| 2 | Trimethoxy methylsilane | | 4.5 | 30 | 90 | 160 | 1.8 | 50 | 6000 | 1500 | 0.73 |
| 3 | Trimethoxy methylsilane | | 5.4 | 10 | 90 | 220 | 2.4 | 150 | 6000 | 1500 | 0.60 |
| 4 | Trimethoxy methylsilane | Dimethyl dimethoxysilane | 4.5 | 10 | 90 | 200 | 2.2 | 100 | 1500 | 1200 | 0.70 |
| 5 | Trimethoxy methylsilane | Tetraethoxy silane | 4.5 | 10 | 90 | 170 | 1.9 | 75 | 8000 | 1800 | 0.72 |
| 6 | Trimethoxy methylsilane | | 4.5 | 10 | 45 | 110 | 2.4 | 50 | 6000 | 1500 | 0.62 |
| 7 | Trimethoxy methylsilane | | 4.5 | 10 | 140 | 300 | 2.1 | 140 | 6000 | 1500 | 0.59 |
| 8 | Trimethoxy methylsilane | | 3.8 | 30 | 85 | 130 | 1.5 | 60 | 6000 | 1500 | 0.76 |
| 9 | Trimethoxy methylsilane | | 5.9 | 10 | 95 | 280 | 2.9 | 130 | 6000 | 1500 | 0.55 |
| 10 | Trimethoxy methylsilane | | 4.5 | 10 | 35 | 100 | 2.9 | 45 | 6000 | 1500 | 0.60 |
| 11 | Trimethoxy methylsilane | | 4.5 | 10 | 160 | 320 | 2.0 | 150 | 6000 | 1500 | 0.70 |
| 12 | Trimethoxy methylsilane | | 3.2 | 30 | 90 | 100 | 1.1 | 40 | 6000 | 1500 | 0.90 |
| 13 | Trimethoxy methylsilane | | 3.4 | 20 | 90 | 120 | 1.3 | 50 | 6000 | 1500 | 0.83 |
| 14 | Trimethoxy methylsilane | | 5.9 | 8 | 95 | 300 | 3.2 | 160 | 6000 | 1500 | 0.50 |
| 15 | Trimethoxy methylsilane | | 3.6 | 20 | 130 | 150 | 1.2 | 60 | 6000 | 1500 | 0.84 |
| 16 | Trimethoxy methylsilane | | 5.9 | 8 | 55 | 180 | 3.3 | 90 | 6000 | 1500 | 0.49 |

In the Table, "conc." denotes "Organosilicon compound concentration", "A" denotes "the number-average particle diameter A", and "B" denotes "the number-average particle diameter B"

Production Example of Polyester Resin A1

| Polyoxypropylene(2.2)-2,2-bis (4-hydroxyphenyl)propane | 76.9 parts (0.167 mol) |

-continued

| | |
|---|---|
| Terephthalic acid (TPA) | 25.0 parts (0.145 mol) |
| Adipic acid | 8.0 parts (0.054 mol) |
| Titanium tetrabutoxide | 0.5 parts |

The above materials were placed in a 4-liter four-necked flask made of glass, and a thermometer, a stirring rod, a condenser and a nitrogen introduction tube were attached to the flask, which was then placed in a mantle heater. Next, the interior of the flask was replaced with nitrogen gas, the temperature was gradually raised while under stirring, and the reaction was conducted for 4 hours under stirring at a temperature of 200° C.

Thereafter, 1.2 parts (0.006 mol) of trimellitic anhydride (TMA) were added and the reaction was allowed to proceed at 180° C. for 1 hour, to yield Polyester Resin A1. The softening temperature of the Polyester Resin A1 was 90° C.

Production Example of Polyester Resin A2

| | |
|---|---|
| Polyoxypropylene(2.2)-2,2-bis(4-hydroxyphenyl)propane | 71.3 parts (0.155 mol) |
| Terephthalic acid | 24.1 parts (0.145 mol) |
| Titanium tetrabutoxide | 0.6 parts |

The above materials were placed in a 4-liter four-necked flask made of glass, and a thermometer, a stirring rod, a condenser and a nitrogen introduction tube were attached to the flask, which was then placed in a mantle heater. Next, the interior of the flask was replaced with nitrogen gas, the temperature was gradually raised while under stirring, and the reaction was conducted for 2 hours under stirring at a temperature of 200° C.

Thereafter, 5.8 parts (0.030 mol) of trimellitic anhydride (TMA) were added and the reaction was allowed to proceed at 180° C. for 10 hours, to yield Polyester Resin A2. The softening temperature of the Polyester Resin A2 was 130° C.

Production Example of Toner Particle 1

| | |
|---|---|
| Polyester Resin A1 | 70.0 parts |
| Polyester Resin A2 | 30.0 parts |
| Fischer-Tropsch wax (peak temperature of 78° C. of maximum endothermic peak) | 5.0 parts |
| C.I. Pigment blue 15:3 | 5.0 parts |
| Aluminum 3,5-di-t-butyl salicylate compound | 0.1 part |

The starting materials in the above formulation were mixed using a Henschel mixer (FM-75 model, by Nippon Coke & Engineering Co., Ltd.) at a rotational speed of 20 s$^{-1}$ and for a rotation time of 5 min, followed by kneading using a twin-screw kneader (PCM-30 model, by Ikegai Corp.) set to a temperature of 125° C. and a rotational speed of 300 rpm. The obtained kneaded product was cooled and coarsely pulverized with a hammer mill to a diameter of 1 mm or less, to obtain a coarsely pulverized product. The obtained coarsely pulverized product was finely pulverized using a mechanical crusher (T-250, by Freund Turbo Corporation).

Further, a rotary classifier (200 TSP, by Hosokawa Micron Corporation) was used for classification, to obtain Toner particle 1. The operating conditions of the rotary classifier (200 TSP, by Hosokawa Micron Corporation) involved herein classification performed at a rotational speed of 50.0 s$^{-1}$ of the classification rotor. The obtained Toner particle 1 had a weight-average particle diameter (D4) of 6.2 m, a Young's modulus of 4000 MPa, and a yield point stress of 1000 MPa.

Production Example of Toner 1

| | |
|---|---|
| Toner particle 1 | 100 parts |
| Toner external additive particles 1 | 5.0 parts |

The above materials were mixed in a Henschel mixer FM-10C model (by Mitsui Miike Chemical Engineering Machinery Co., Ltd.) at a rotational speed of 65 s$^{-1}$ and for a rotation time of 10 min, to obtain Toner 1. The coverage ratio of the toner particle surface by the external additive was 55 area %, and the fixing ratio of the external additive was 50%.

Production Example of Toners 2 to 24

Toners 2 to 24 were produced and obtained in the same way as in the production example of Toner 1, but modifying herein the toner external additive particles, the addition amount and the external addition conditions as given in Table 2.

Table 2 sets out the coverage ratio and fixing ratio of the toners.

TABLE 2

| | External additive | | External addition conditions | | Toner properties | |
|---|---|---|---|---|---|---|
| | Type | Addition amount (parts) | Rotational speed s$^{-1}$ | External addition time min | Coverage ratio area % | Fixing ratio % |
| Toner 1 | Toner external additive particles 1 | 5.0 | 65 | 10 | 55 | 50 |
| Toner 2 | Toner external additive particles 1 | 5.0 | 65 | 20 | 50 | 80 |
| Toner 3 | Toner external additive particles 1 | 5.0 | 65 | 5 | 55 | 30 |
| Toner 4 | Toner external additive particles 1 | 5.0 | 65 | 30 | 48 | 85 |
| Toner 5 | Toner external additive particles 1 | 5.0 | 50 | 5 | 55 | 20 |
| Toner 6 | Toner external additive particles 1 | 3.0 | 65 | 10 | 33 | 55 |
| Toner 7 | Toner external additive particles 1 | 8.0 | 65 | 10 | 70 | 45 |
| Toner 8 | Toner external additive particles 1 | 1.0 | 50 | 10 | 25 | 50 |
| Toner 9 | Toner external additive particles 1 | 10.0 | 65 | 10 | 75 | 50 |
| Toner 10 | Toner external additive particles 2 | 5.0 | 65 | 10 | 60 | 55 |
| Toner 11 | Toner external additive particles 3 | 5.0 | 65 | 10 | 50 | 45 |
| Toner 12 | Toner external additive particles 4 | 5.0 | 65 | 10 | 53 | 40 |

TABLE 2-continued

|  | External additive | | External addition conditions | | Toner properties | |
|---|---|---|---|---|---|---|
|  | Type | Addition amount (parts) | Rotational speed $s^{-1}$ | External addition time min | Coverage ratio area % | Fixing ratio % |
| Toner 13 | Toner external additive particles 5 | 5.0 | 65 | 10 | 50 | 55 |
| Toner 14 | Toner external additive particles 6 | 5.0 | 65 | 10 | 65 | 55 |
| Toner 15 | Toner external additive particles 7 | 5.0 | 65 | 10 | 40 | 35 |
| Toner 16 | Toner external additive particles 8 | 5.0 | 65 | 10 | 60 | 50 |
| Toner 17 | Toner external additive particles 9 | 5.0 | 65 | 10 | 35 | 40 |
| Toner 18 | Toner external additive particles 10 | 5.0 | 65 | 10 | 70 | 55 |
| Toner 19 | Toner external additive particles 11 | 5.0 | 65 | 10 | 30 | 25 |
| Toner 20 | Toner external additive particles 12 | 5.0 | 65 | 10 | 60 | 55 |
| Toner 21 | Toner external additive particles 13 | 5.0 | 65 | 10 | 57 | 55 |
| Toner 22 | Toner external additive particles 14 | 5.0 | 65 | 10 | 30 | 30 |
| Toner 23 | Toner external additive particles 15 | 5.0 | 65 | 10 | 45 | 40 |
| Toner 24 | Toner external additive particles 16 | 5.0 | 65 | 10 | 40 | 30 |

Production Example of Carrier 1

Magnetite 1 (intensity of magnetization of 65 Am²/kg in a 1000/47c (kA/m) magnetic field), having a number-average particle diameter of 0.30 μm.

Magnetite 2 (intensity of magnetization of 65 Am²/kg in a 1000/47c (kA/m) magnetic field), having a number-average particle diameter of 0.50 μm.

Herein 4.0 parts of a silane compound (3-(2-aminoethylaminopropyl) trimethoxysilane) were added to 100 parts of each of the above materials, with high-speed mixing and stirring at 100° C. or above, inside the vessel, to treat the respective fine particles.

Phenol: 10 mass %

Formaldehyde solution: 6 mass % (formaldehyde 40 mass %, methanol 10 mass %, water 50 mass %)

Magnetite 1 treated with the above silane compound: 58 mass %

Magnetite 2 treated with the above silane compound: 26 mass %

Then 100 parts of the above materials, 5 parts of a 28 mass % aqueous ammonia solution, and 20 parts of water were charged into a flask, the temperature was raised to 85° C. over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried. Next, the resulting product was dried under reduced pressure (5 mmHg or lower) at a temperature of 60° C., to yield a spherical Carrier 1 of magnetic body-dispersed type. The volume-basis 50% particle diameter (D50) of Carrier 1 was 34.2 μm.

Production Example of Two-Component Developer 1

Herein 8.0 parts of Toner 1 were added to 92.0 parts of Carrier 1, with mixing using a V-type mixer (V-20, by Seishin Enterprise Co., Ltd.), to obtain Two-component developer 1.

Production Example of Two-Component Developers 2 to 24

Two-component developers 2 to 24 were produced in the same way as in the production example of Two-component developer 1, but herein the toner was modified as given in Table 3.

TABLE 3

| Two-component developer No. | Toner No. | Carrier No. |
|---|---|---|
| Two-component developer 1 | Toner 1 | Carrier 1 |
| Two-component developer 2 | Toner 2 | Carrier 1 |
| Two-component developer 3 | Toner 3 | Carrier 1 |
| Two-component developer 4 | Toner 4 | Carrier 1 |
| Two-component developer 5 | Toner 5 | Carrier 1 |
| Two-component developer 6 | Toner 6 | Carrier 1 |
| Two-component developer 7 | Toner 7 | Carrier 1 |
| Two-component developer 8 | Toner 8 | Carrier 1 |
| Two-component developer 9 | Toner 9 | Carrier 1 |
| Two-component developer 10 | Toner 10 | Carrier 1 |
| Two-component developer 11 | Toner 11 | Carrier 1 |
| Two-component developer 12 | Toner 12 | Carrier 1 |
| Two-component developer 13 | Toner 13 | Carrier 1 |
| Two-component developer 14 | Toner 14 | Carrier 1 |
| Two-component developer 15 | Toner 15 | Carrier 1 |
| Two-component developer 16 | Toner 16 | Carrier 1 |
| Two-component developer 17 | Toner 17 | Carrier 1 |
| Two-component developer 18 | Toner 18 | Carrier 1 |
| Two-component developer 19 | Toner 19 | Carrier 1 |
| Two-component developer 20 | Toner 20 | Carrier 1 |
| Two-component developer 21 | Toner 21 | Carrier 1 |
| Two-component developer 22 | Toner 22 | Carrier 1 |
| Two-component developer 23 | Toner 23 | Carrier 1 |
| Two-component developer 24 | Toner 24 | Carrier 1 |

Example 1

The following evaluation was performed on Two-component developer 1.

Two-component developer 1 was introduced into a cyan-position developing device, using an image forming apparatus in the form of a remodeled printer imageRUNNER ADVANCE C5560 for digital commercial printing, by Canon Inc., and cleaning performance was evaluated.

The amount of discharge current in the primary charging step was set to 100 μA (the definition of discharge current is set forth in Japanese Patent Application Publication No. 2009-128842). There was used a photosensitive drum having a taper wear amount of 0.5 mg (the method for measuring the taper wear amount is described in Japanese Patent Application Publication No. 2009-128842), the surface of the photosensitive drum having Rz=1.0 μm and Sm=50 μm. The surface roughness of the photosensitive drum was measured as described below using a contact-type surface roughness measuring device (product name: SURFCORDER SE3500, by Kosaka Laboratory Co., Ltd.).

There were set detector: R2 μm; 0.7 mN diamond needle; filter: 2CR; cutoff value: 0.8 mm; measurement length: 2.5 mm; and feed rate: 0.1 mm, and data of 10-point average roughness Rz defined in accordance with the JIS standard B0601 was processed. The average spacing Sm of surface unevenness is an arithmetic mean value obtained on the basis of the following expression, and measured under the same conditions.

$$Sm = \frac{1}{n}\sum_{i=1}^{n} Smi$$

Examples of roughening means for controlling the surface profile of the photosensitive drum include, though not limited to, polishing sheets and blast abrasives.

Evaluation conditions of cleaning performance were as follows.
Cleaning Evaluation Condition 1
Environment: 23° C. 5% RH
Discharge current in primary charging step: 100 μA
Cleaning blade setting angle: 20°
Cleaning blade support method: swing-type spring pressure 700 gf
Pressing force (linear pressure) of the cleaning blade on the photosensitive drum: 30 gf/cm
Laid-on level on photosensitive drum: 0.3 to 0.4 mg/cm$^2$
Toner charge quantity: 35 to 50 μC/g Under the above conditions, untransferred toner equivalent to 10 prints of A3 paper was supplied to the cleaning blade at a process speed of 260 mm/sec, with subsequent stoppage and measurement of the amount of toner that slipped through the cleaning blade. The photosensitive member was taped, and the amount of slip-through toner was estimated on the basis of reflection density, using an X-Rite.

The evaluation criteria are as follows. The evaluation results are given in Table 3.
A: reflection density lower than 0.010
B: reflection density from 0.010 to less than 0.015
C: reflection density from 0.015 to less than 0.020
D: reflection density equal to or higher than 0.020
Cleaning Evaluation Condition 2
Environment: 30° C. 80% RH
Discharge current in primary charging step: 100 μA
Cleaning blade setting angle: 200

Cleaning blade support method: swing-type spring pressure 700 gf
Pressing force (linear pressure) of the cleaning blade on the photosensitive drum: 30 gf/cm
Laid-on level on photosensitive drum: 0.3 to 0.4 mg/cm$^2$
Toner charge quantity: 20 to 40 μC/g Under the above conditions, ten A3 solid images were printed at a process speed of 260 mm/sec. Thereafter, 100 prints of A3 solid white were printed, and the level of faulty cleaning (toner slip-through) occurring on the solid white image was evaluated.

The evaluation criteria are as follows. The evaluation results are given in Table 4.
A: 0 to 3 small streak-like defects
B: 4 to 7 small streak-like defects
C: 8 to 10 small streak-like defects;
 alternatively, 1 to 3 streak-like defects of several cm
D: 11 or more small streak-like defects;
 alternatively, 4 or more streak-like defects of several cm;
 alternatively, occurrence of blade tuck-up Cleaning evaluation 1 is an evaluation under harsh conditions for slip-through at low humidity.

Cleaning evaluation 2 is an evaluation under harsh conditions for vibration/tuck-up of the cleaning blade at high temperature and high humidity.

The swing-type method as a support method of the cleaning blade has enhanced functionality in terms of hugging of the surface of the photosensitive drum. Cleaning performance against slip-through is improved as a result, but conversely, blade tuck-up may occur if the blade is suddenly brought in the running direction of the surface of the photosensitive drum upon an instantaneous rise in the friction coefficient between the photosensitive drum and the blade. The evaluation results are given in Table 4.

Examples 2 to 24

Table 4 sets out the setting of the cleaning blade and the developing agent that was used in each example. The evaluation results are given in Table 4.

Comparative Examples 1 to 5

Table 4 sets out the setting of the cleaning blade and the developing agent that was used in each comparative example. The evaluation results are given in Table 4.

TABLE 4

| | | Cleaning setting | | Cleaning evaluation 1 | | Cleaning evaluation 2 | | |
| --- | --- | --- | --- | --- | --- | --- | --- | --- |
| | | Support method | Linear pressure gf/cm | Rank | Reflection density | Rank | Small streaks | Streaks of several cm |
| Example 1 | Two-component developer 1 | Swinging | 30 | A | 0.005 | A | 2 | 0 |
| Example 2 | Two-component developer 1 | Swinging | 20 | A | 0.008 | A | 1 | 0 |
| Example 3 | Two-component developer 1 | Swinging | 40 | A | 0.003 | A | 2 | 0 |
| Example 4 | Two-component developer 1 | Fixed | 30 | A | 0.008 | A | 1 | 0 |
| Example 5 | Two-component developer 2 | Fixed | 30 | B | 0.011 | B | 6 | 0 |
| Example 6 | Two-component developer 3 | Fixed | 30 | B | 0.013 | A | 3 | 0 |
| Example 7 | Two-component developer 4 | Fixed | 30 | B | 0.012 | C | 8 | 1 |
| Example 8 | Two-component developer 5 | Fixed | 30 | B | 0.015 | B | 5 | 0 |
| Example 9 | Two-component developer 6 | Fixed | 30 | B | 0.012 | B | 7 | 0 |
| Example 10 | Two-component developer 7 | Fixed | 30 | B | 0.014 | A | 3 | 0 |
| Example 11 | Two-component developer 8 | Fixed | 30 | B | 0.014 | C | 9 | 2 |
| Example 12 | Two-component developer 9 | Fixed | 30 | C | 0.018 | B | 5 | 0 |
| Example 13 | Two-component developer 10 | Fixed | 30 | A | 0.009 | A | 2 | 0 |

TABLE 4-continued

|  |  | Cleaning setting | | Cleaning evaluation 1 | | Cleaning evaluation 2 | | |
| --- | --- | --- | --- | --- | --- | --- | --- | --- |
|  |  | Support method | Linear pressure gf/cm | Rank | Reflection density | Rank | Small streaks | Streaks of several cm |
| Example 14 | Two-component developer 11 | Fixed | 30 | C | 0.015 | B | 7 | 0 |
| Example 15 | Two-component developer 12 | Fixed | 30 | A | 0.007 | A | 3 | 0 |
| Example 16 | Two-component developer 13 | Fixed | 30 | A | 0.008 | B | 7 | 0 |
| Example 17 | Two-component developer 14 | Fixed | 30 | B | 0.014 | A | 1 | 0 |
| Example 18 | Two-component developer 15 | Fixed | 30 | B | 0.010 | C | 9 | 2 |
| Example 19 | Two-component developer 16 | Fixed | 30 | C | 0.016 | A | 2 | 0 |
| Example 20 | Two-component developer 17 | Fixed | 30 | B | 0.013 | C | 8 | 1 |
| Example 21 | Two-component developer 16 | Fixed | 20 | C | 0.019 | A | 1 | 0 |
| Example 22 | Two-component developer 17 | Fixed | 40 | C | 0.018 | C | 9 | 2 |
| Example 23 | Two-component developer 18 | Fixed | 30 | C | 0.017 | C | 5 | 1 |
| Example 24 | Two-component developer 19 | Fixed | 30 | C | 0.018 | C | 9 | 3 |
| C.E. 1 | Two-component developer 20 | Fixed | 30 | D | 0.050 | C | 10 | 3 |
| C.E. 2 | Two-component developer 21 | Fixed | 30 | D | 0.025 | B | 8 | 2 |
| C.E. 3 | Two-component developer 22 | Fixed | 30 | D | 0.024 | D | 20 | 7 |
| C.E. 4 | Two-component developer 23 | Fixed | 30 | D | 0.022 | B | 5 | 0 |
| C.E. 5 | Two-component developer 24 | Fixed | 30 | D | 0.021 | D | 11 | 3 |

In the Table, "C.E." denotes "Comparative example".

The evaluation results revealed that the toner of the present disclosure afforded excellent cleaning performance, as given in Table 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-205200, filed Dec. 10, 2020, and Japanese Patent Application No. 2021-187460, filed Nov. 18, 2021, which are hereby incorporated by reference herein in their entirety.

What is claimed is:

1. An external additive for toner, comprising:
an organosilicon polymer particle having an average circularity of 0.50 to 0.74, the organosilicon polymer particle being obtained by condensation-polymerizing a silane compound comprising a trimethoxymethylsilane monomer, wherein
$1.5 \leq B/A \leq 3.0$ when A (nm) is the number-average particle diameter of primary particles of the external additive measured using a scanning electron microscope, and B (nm) is the number-average particle diameter of the external additive measured in accordance with a centrifugal sedimentation method.

2. The external additive according to claim 1, wherein $40 \leq A \leq 150$.

3. The external additive according to claim 1, which has a Young's modulus of 1000 to 30000 MPa.

4. The external additive according to claim 1, which has a yield point stress of 1000 to 10000 MPa.

5. The external additive according to claim 1, which has a half width of a number particle size distribution measured in accordance with a centrifugal sedimentation method of 50 to 150 nm.

6. The external additive according to claim 1, which has an average circularity of 0.60 to 0.74.

7. A toner, comprising:
a toner particle comprising a binder resin; and
an external additive comprising an organosilicon polymer particle having an average circularity of 0.50 to 0.74, the organosilicon polymer particle being obtained by condensation-polymerizing a silane compound comprising a trimethoxymethylsilane monomer, wherein
$1.5 \leq B/A \leq 3.0$ when A (nm) is the number-average particle diameter of primary particles of the external additive measured using a scanning electron microscope, and B (nm) is the number-average particle diameter of the external additive measured in accordance with a centrifugal sedimentation method.

8. The toner according to claim 7, wherein the content of the external additive is 1.0 to 10.0 parts by mass relative to 100 parts by mass of the toner particle.

9. The toner according to claim 7, wherein a coverage ratio of the toner particle by the external additive is 30 to 70 area %.

10. The toner according to claim 7, wherein a fixing ratio of the external additive on the toner particle is 30 to 80%.

11. An image forming apparatus, comprising:
toner; and
a cleaning member removing the toner from an image bearing member that supports the toner, the cleaning member comprising a blade formed of an elastic body, the blade being in contact with the image bearing member on account of a pressing force, so that the blade swings about a swing fulcrum; and
the toner comprising a toner particle comprising a binder resin, and an external additive comprising an organosilicon polymer particle having an average circularity of 0.50 to 0.74, the organosilicon polymer particle being obtained by condensation-polymerizing a silane compound comprising a trimethoxymethylsilane monomer, wherein
$1.5 \leq B/A \leq 3.0$ when A (nm) is the number-average particle diameter of primary particles of the external additive measured using a scanning electron microscope, and B (nm) is the number-average particle diameter of the external additive measured in accordance with a centrifugal sedimentation method, and
the pressing force of the blade on the image bearing member is 20 to 40 gf/cm, as linear pressure on the image bearing member.

* * * * *